United States Patent Office 2,983,594
Patented May 9, 1961

2,983,594

TRACE ELEMENT FERTILIZERS

Walter Jost, In der Calle uber Iserlohn, Hemberg 1, Germany

No Drawing. Filed Mar. 14, 1957, Ser. No. 645,907

Claims priority, application Germany Mar. 22, 1956

2 Claims. (Cl. 71—1)

During the course of the last twenty years, a large number of different proposals has been made for supplying the soil with the trace elements which are necessary for the growth of plants. One reason for making these proposals was the desire to replace the copper sulphate, which was used for application to soils deficient in copper, by another substance.

In order to achieve this object it has been proposed, for example, to use the slag or waste which is produced in the smelting of copper ores and, after cooling, to grind it finely in a water bath and to apply the ground material to land which is deficient in copper.

Another method which has been proposed is to use for the fertilisation of soils deficient in copper the roast products which were likewise produced in the copper-producing industry.

A further proposal was to use the factory wastes produced in the copper-working industry for the treatment of soils deficient in copper. Such waste products from the factory which, as is well-known, often have a high content of metal, were not directly used as a copper fertiliser but the metals contained in these waste products were recovered by the industry by suitable treatment. Only the grinding wastes produced by such treatment or sludges produced by a wet mechanical treatment were then used for application to soils deficient in copper. However, the metal content in the waste products from such grinding or mechanical treatments was, of course, only small.

A further method which must be mentioned, is to use as a preliminary material, basalt, phonolith, tourmaline, anthracite coal ash etc. These preliminary materials do not, of course, naturally contain the desired active metal substances. In order that they should have the desired metal contents, it was proposed that the grinding bodies or grinding plates used in the necessary grinding process should not be made as previously of steel alloys but that there should be introduced into the necessary grinding process metal bodies such as, for example, copper balls and the like which are naturally soft and, therefore, produce the required metal during the grinding process. Owing to this wearing away of the parts which are introduced into the grinding process and contain the individual trace elements, the necessary grinding process can be used for enrichment with the desired metals without a further operation being necessary. The final product obtained by this proposed method contained only about 0.4% Cu.

Another previous proposal was an attempt to ensure a permanent fertilisation of the land. In this case also metal-containing residues and waste products of the metal working industry were used as a preliminary material. The desired permanent fertilisation of the land was obtained by the application of the metal-containing substances in three different forms to the land, namely in an oxidic and in a metallic form and at the same time also in the form of slag. The oxidic material supplies the desired copper ions for the first year of growth. The metallic fraction is added in finely-ground form. Owing to the conditions existing in the soil the latter is converted in from 2–4 years into a form which is assimilable by plants. The metal slag which is known to be more difficulty soluble only releases the necessary copper ions in later years.

All the above-mentioned prior processes for the manufacture or use of trace element fertilizers, although different in some respects, have a common feature, namely all the fertilisers contain only small proportions of the active metal substances which are necessary for treating deficient soils and for the growth of healthy plants. The active substances are copper, zinc, cobalt, manganese, molybdenum, boron and, to a lesser extent iron, which, as trace elements are known to be necessary to plant life. Any other substances must, therefore, be ineffective or ballast substances and such ballast substances are also present to an extent of 90% or more in the trace element fertilisers of the above-mentioned proposals. Such undesirable ballast substances must, however, be ground down together with the trace element substances during the manufacture of such trace element fertilisers and this obviously gives rise to considerable additional expense. The ballast substances also, of course, increase the total volume which again increases the cost of packing. The extra costs of transport, freight and so forth are also considerable. Further, the storage of such trace element fertilisers containing a high proportion of ballast substances takes up unnecessary space, and considerably greater expense and more work is involved in scattering them over the land to be fertilised.

These ballast substances, however, are not the only unnecessary substances present in the known trace element fertilisers which frequently also contain constituents which are objectionable for fertilising purposes, for example a high percentage of iron.

The present invention opens up a new way. Although the invention makes use of factory wastes in addition to other metal-containing substances, only those substances are used as the preliminary or starting material which have high contents of metal in order that only highly concentrated fertilisers may be offered to the farmer for fertilisation with trace elements. The starting materials which are used in accordance with the present invention are, for example, copper hammer scale, i.e. a lower oxide of copper which is produced as waste in copper rolling mills. The content of copper, which is the active substance, is extremely high, namely about 85%. Copper sulphate, which was previously used and was made by an expensive chemical method, has a copper content of only 25%. In addition to copper scale, other materials, for example the dust produced in grinding brass, can be used. Such brass dust, which also contains other metals, has a copper content of 55% and above this.

If now, for example, the two above-mentioned highly concentrated factory waste products are mixed together, it is obvious that the mixture does not only contain copper (which is a disadvantage of the previously used copper sulphate) but also contains a considerable proportion of zinc which, as is well-known, activates the copper. In addition a proportion of cobalt, manganese, molybdenum, boron and iron is also present.

In order now to obtain a material having a copper content which is suitable for use on land deficient in copper, 60 parts of copper hammer scale containing 85% Cu, yielding 51 parts Cu, and 40 parts of brass dust containing 55% Cu, yielding 22 parts Cu, are taken. This mixture, therefore, has a Cu content of 73%. Such a highly concentrated trace element fertiliser is only obtained, however, because, in contradistinction to previous proposals, the high metal contents contained in such factory wastes are allowed to remain in the wastes and these are applied directly to the land, being mixed, if desired, with other fertilisers.

The present invention also provides another new method for the manufacture of trace element fertilisers. Whereas it was previously necessary to manufacture trace element fertilisers by complicated technical processes, in accordance with the present invention there are selected substances having high metal contents and which, owing to their character, no longer require further grinding or other technical treatment. Copper hammer scale, in addition to its high copper content, also has the property that, owing to its structure, it need not be further disintegrated. It is a waste product which can be crushed between the fingers. Also the brass dust used by the invention requires no further disintegration or grinding, since by its nature it is already very finely divided and has a desirably large surface area.

Such metal-containing substances and similar substances which it is proposed to use are introduced, according to one method of carrying out the invention, without further technical or chemical treatment during the manufacturing process of a main fertiliser. Thus, Thomas slags, for example, need to be ground and then, after having a sufficiently large surface area produced by fine grinding, are scattered as Thomas meal over the land. This process, which is necessary for the manufacture of Thomas meal, is directly combined with the process of the invention. Again the trace elements can be incorporated in a similar manner during the manufacture of potassium and lime fertilisers. Even the technical processes which are carried out in the manufacture of nitrogen fertilisers such as take place in separators, mixing apparatus, worm mixers, spraying towers, rotary furnaces and the like, admit of the high grade trace element substances of the invention being mixed with the main fertiliser without difficulty.

The main fertilisers in addition serve as diluents and enable the trace element substances to be well and uniformly distributed over the land.

In order to enable the invention to be carried into effect, the following practical example of the use of a trace element fertiliser for land deficient in copper is given. It is assumed that the copper content of the trace element fertiliser is 73% as above mentioned.

*Necessary amount of the trace element fertiliser of the invention*

| | | |
|---|---|---|
| 1. On ground having a slight copper deficiency. (Necessary amount of pure copper per hectare 1 kg.). (In this case no effect of trace element deficiency can be determined from the external appearance of the plants. The yield of grain, however, falls off, in comparison with ground which has been fertilised with copper, by about 10% | 1.37 kg.. | E.g. This amount can be mixed with 250 kg. of a 20% nitrogen fertiliser so that the fertiliser contains about 0.4% Cu. The nitorgen is added on the average per hectare of grain. |
| 2. On ground with an average copper deficiency. (The necessary amount of pure copper per hectare 2 kg.). (The copper deficiency is noticeable by slight discolouration of leaves non-uniform growth and slight misformation. Reduction of the yield of grain up to 30%.) | 2.74 kg.. | Fertiliser contains 0.8% Cu and mixed as in Example 1. |
| 3. On ground having a large copper deficiency. (Necessary amount of pure copper per hectare 3 kg.). (In this case the deficiency is readily apparent owing to leaf discolouration (chlorosis), the ears almost barren, decrease in yield 70%. In this stage there is a danger of transmitting deficiency diseases to the animal world, lower milk yield, lower fat content.) | 4.11 kg.. | Fertiliser contains 1.2% Cu and mixed as in Example 1. |
| 4. For making moorland and heath land arable. (Necessary copper content per hectare 4 kg.) (Dry leaf disease also occurs on this ground, and then up to 100 kg. manganese sulphate per hectare must also be added. Further, in case of leaf necrosis and dry rot 15 kg. of borax per hectare must also be scattered on the ground.) | 5.48 kg.. | Fertiliser contains 1.6% Cu and mixed as in Example 1. |

From what has been stated above, therefore, it will be seen that the present invention represents a considerable improvement over the previously known methods of fertilisation. In addition exhaustive experiments at a number of recognised scientific research stations have proved that a trace element fertiliser in accordance with the invention is considerably superior both for cultivation in the open ground and in pots to copper sulphate which was hitherto considered to be the standard remedy for the deficiency in question. An experiment which was carried out in 1956 at the Agrikulturchemischen Institut der Justus Liebig-Hochschule in Giesen by Professor Dr. K. Scharrer will now be mentioned. This experiment was carried out on a soil deficient in copper and oats served as the experimental plant.

| Fertiliser | Straw | Yield of full grains | Barren grains |
|---|---|---|---|
| Complete Fertiliser (NPK without copper) | 90.4 | 7.5 | 15.5 |
| Complete Fertiliser+3.6 kg./Hectare Cu in the form of the material of the invention | 71.6 | 37.0 | 6.9 |
| Complete Fertiliser+3.6 kg./Hectare Cu in the form of copper sulphate | 82.6 | 18.2 | 11.6 |

In evaluating this experiment the number of barren grains must not be overlooked because it was found that, with the use of copper sulphate, it is twice as high as when the fertiliser of the invention was used.

For plant fertilisation the trace element fertiliser of the present invention can be mixed, for example, with Thomas potash. For spring fertilising any nitrogen-containing fertiliser can be used. Since the admixed metal compounds are rapidly and automatically converted into the desired metal salts on being mixed with a fertiliser containing ammonia, trace element substances can be effectively added to the main fertilisers.

Copper fertilisers have hereinbefore mainly been referred to. However, any desired trace elements in the form of the said or similar highly concentrated preliminary materials can be used for fertilising deficient soils and can be used either alone or in mixture with other concentrated metal-containing wastes to which they are added in the course of the manufacture of commercial fertilisers. For this reason another possibility, namely for making a zinc fertiliser for soils deficient in zinc will now be described.

As is well-known, in galvanising installations and also in zinc smelting works, waste zinc is produced. Such waste has a Zn content of about 25–65%. As compared with zinc sulphate, this waste also has a very high Zn content. This waste zinc consists mainly of zinc oxide and very fine metal grains. This material therefore has the same possibilities for use as a trace element fertiliser as copper-containing wastes previously described.

I claim:

1. The method of fertilizing agricultural land with waste products from the copper-fabricating industries, said waste products having large surface area and containing copper and traces of elements, selected from the group consisting of zinc, cobalt, manganese, molybdenum, boron and iron, which comprises fertilizing said land directly and without further treatment with said waste products, finely divided, containing copper in amounts ranging from 44 to 85 percent and in the form of compounds, selected from the group consisting of copper grinding dust, copper hammer scale, lower copper oxides and mixtures thereof.

2. The method as claimed in claim 1, wherein said waste products are mixed with commercial fertilizers during their manufacture.

References Cited in the file of this patent

UNITED STATES PATENTS

| 1,614,305 | Johnson | Jan. 11, 1927 |
| 2,280,451 | Riddle | Apr. 21, 1942 |
| 2,532,548 | Heide | Dec. 5, 1950 |